United States Patent
Braid et al.

[11] Patent Number: 6,144,803
[45] Date of Patent: Nov. 7, 2000

[54] RECASE ONE-TIME-USE CAMERA WITH LENS SURROUND CHANGE OF SHAPE

[75] Inventors: David T. Braid, Rochester; Randy E. Horning, Leroy, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/056,961

[22] Filed: Apr. 8, 1998

[51] Int. Cl.⁷ .................................................. G03B 17/24
[52] U.S. Cl. .............................................. 396/6; 396/535
[58] Field of Search ................................ 396/6, 529, 535, 396/536, 538, 541

[56] References Cited

U.S. PATENT DOCUMENTS

| | | | |
|---|---|---|---|
| D. 374,881 | 10/1996 | Chapman et al. | D16/218 |
| 4,855,774 | 8/1989 | Ohmura et al. | 396/6 |
| 4,890,130 | 12/1989 | Takei et al. | 396/6 |
| 4,954,857 | 9/1990 | Michida et al. | 396/6 |
| 5,146,255 | 9/1992 | Nakai et al. | 396/6 |
| 5,202,713 | 4/1993 | Nakai et al. | 396/6 |
| 5,255,041 | 10/1993 | Lyon et al. | 396/6 |
| 5,329,330 | 7/1994 | Sakai et al. | 396/6 |
| 5,349,410 | 9/1994 | Kamata | 396/6 |
| 5,517,270 | 5/1996 | Balling | 396/536 |
| 5,552,850 | 9/1996 | Matsumoto | 396/420 |
| 5,555,063 | 9/1996 | Balling | 396/538 |
| 5,581,321 | 12/1996 | Boyd | 396/535 |
| 5,600,391 | 2/1997 | VanDeMoere et al. | 396/6 |
| 5,634,164 | 5/1997 | Isozaki | 396/6 |
| 5,815,740 | 9/1998 | Wagner | 396/6 |

*Primary Examiner*—David Gray
*Attorney, Agent, or Firm*—Roger A. Fields

[57] ABSTRACT

A one-time-use camera provided with a taking lens, and a front cover part that includes a lens surround having a lens opening for the taking lens, is characterized in that an outer cover part is positioned over the front cover part and includes a lens surround shaped distinctively different than the lens surround of the front cover part, has an open-air lens opening, and is fitted over the lens surround of the front cover part in a way that the lens opening in the lens surround of the outer cover part is optically aligned with the lens opening in the lens surround of the front cover part, in order to recase the one-time-use camera.

5 Claims, 4 Drawing Sheets

RECASE ONE-TIME-USE CAMERA WITH LENS SURROUND CHANGE OF SHAPE

CROSS REFERENCE TO RELATED APPLICATIONS

Reference is made to commonly assigned copending applications Ser. No. 09/056,948, entitled ONE-TIME-USE CAMERA WITH BREAK-AWAY OUTER COVER and filed Apr. 08, 1998 in the names of Jennifer Linnane, and Ser. No. 09/056,534, entitled METHOD OF REMOVING EXPOSED FILM FROM RECASED ONE-TIME-USE CAMERA and filed Apr. 08, 1998 in the names of Randy E. Horning, James G. Rydelek & Will J. Kropp.

FIELD OF THE INVENTION

The invention relates generally to the field of photography, and in particular to one-time-use cameras. More specifically, the invention relates to a one-time-use camera that is recased during recycling of the one-time-use camera.

BACKGROUND OF THE INVENTION

Film and cameras that are all in one, commonly referred to as single-use or one-time-use cameras, have become well known. The one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages the filmstrip, a manually rotatable thumbwheel rotatably engaged with a film spool inside the film cartridge, a single-blade shutter, a manually depressible shutter release button, a rotatable frame counter for indicating the number of exposures remaining for picture-taking, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

There is a problem in the recycling, i.e. reuse, of used camera parts, in that the reused parts may become worn or damaged. Thus, it has been suggested that any worn or damaged parts be purposely fractured to render them detectably different, during disassembly of the one-time-use camera to retrieve the exposed film. This allows the worn or damaged parts to be readily identified, to be discarded, and prevents them from being erroneously reused.

One specific example of a possible solution to the problem is disclosed in prior art U.S. Pat. No. 5,349,410 issued Sep. 20, 1994. The patent suggests that an anti-backup pawl for the thumbwheel be broken when the rear cover part is separated from the main body part in order to obtain the film cartridge from the cartridge receiving chamber. The rear cover part has a projecting hook that extends through a hole in the anti-backup pawl to engage the pawl. The anti-backup pawl is connected to the main body part at a location which includes a weakened notch section. Thus, separating the rear cover part from the main body part breaks the anti-backup pawl away from the main body part at the weakened notch section. Consequently, the main body part can never be reused. However, it may be cost-effective and resource-conserving to recycle the main body part when it is reusable.

Another specific example of a possible solution to the problem involves the rear cover part. The rear cover part sometimes has an integral door portion that is to be opened to remove the film cartridge from the cartridge receiving chamber. See U.S. Pat. No. 5,239,330 issued Jul. 12, 1994. A grooved line of weakness forms a living hinge between the door portion and a remaining portion of the rear cover part, and tends to fracture when the door portion is opened. The fractured line of weakness permits the door portion to be readily separated from the remaining portion of the rear cover part, to prevent the rear cover part from being reused. However, the rear cover part may be reused, provided an opaque connecting-tape is adhered to the fractured line of weakness. This is obviously undesirable from a quality standpoint.

SUMMARY OF THE INVENTION

A one-time-use camera comprising a taking lens, and a front cover part that includes a lens surround having a lens opening for the taking lens, is characterized in that:

an outer cover part is positioned over the front cover part and includes a lens surround shaped distinctively different than the lens surround of the front cover part, has an open-air lens opening, and is fitted over the lens surround of the front cover part in a way that the lens opening in the lens surround of the outer cover part is optically aligned with the lens opening in the lens surround of the front cover part, in order to recase the one-time-use camera.

DETAILED DESCRIPTION OF THE INVENTION

Figure 1:
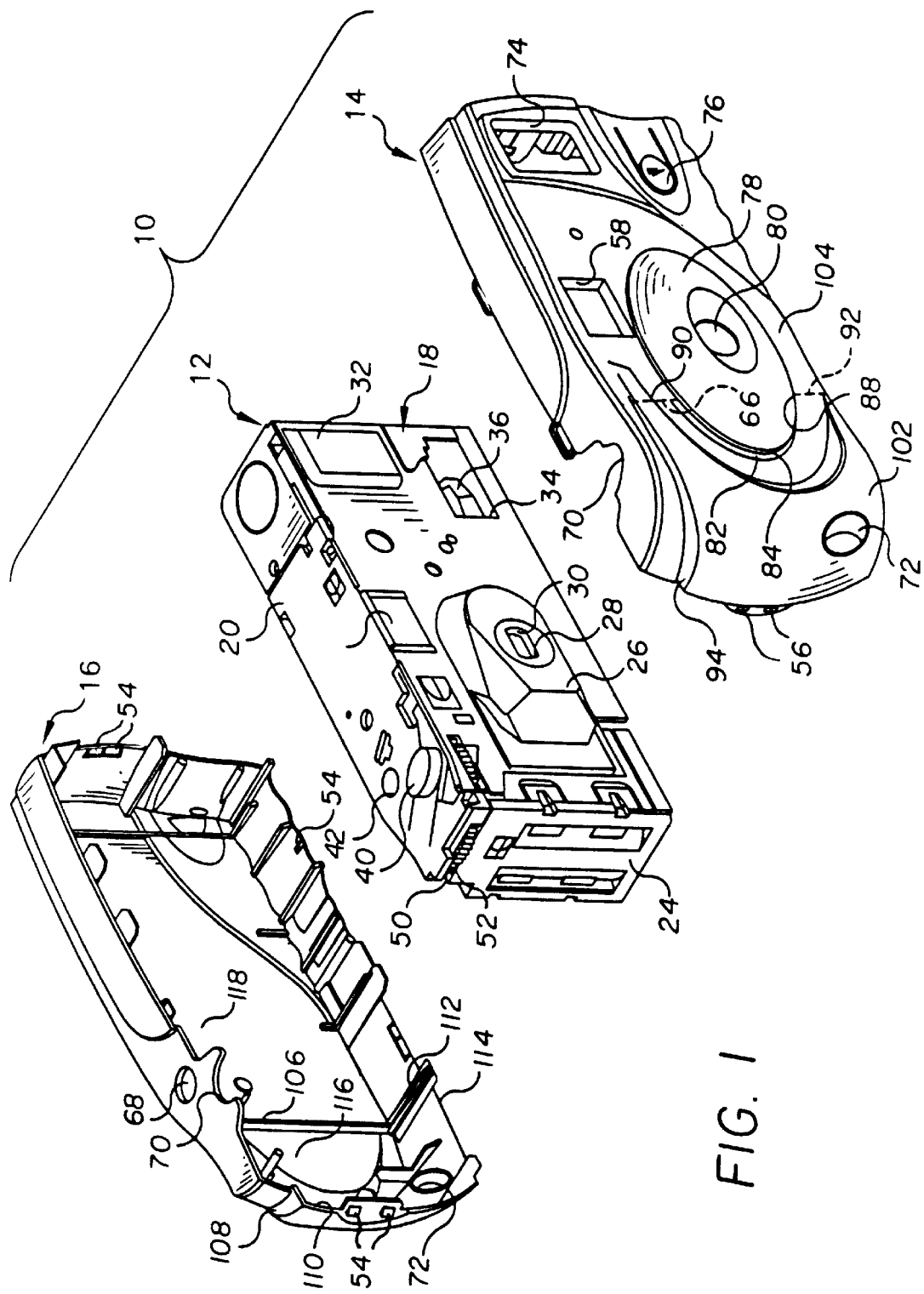
FIG. 1 is an exploded front perspective view of a one-time-use camera according to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a recased one-time-use camera 10 comprising a recycled one-time-use camera 12, such as a "Kodak FunSaver 35 With Flash", and a pair of opaque outer front and rear cover parts 14 and 16 that together serve to recase the recycled camera.

The recycled camera 12 includes an opaque front cover part 18, a translucent top plate 20, an opaque rear cover part 22, and an opaque cartridge chamber cover-door 24 that may be pulled away at one of the camera ends to retrieve a film cartridge from a cartridge receiving chamber (not shown). The front cover part 18, the top plate 20, the rear cover part 22, and the cartridge chamber cover-door 24 are releasably held in place via snap-connections (not shown).

Figure 2:
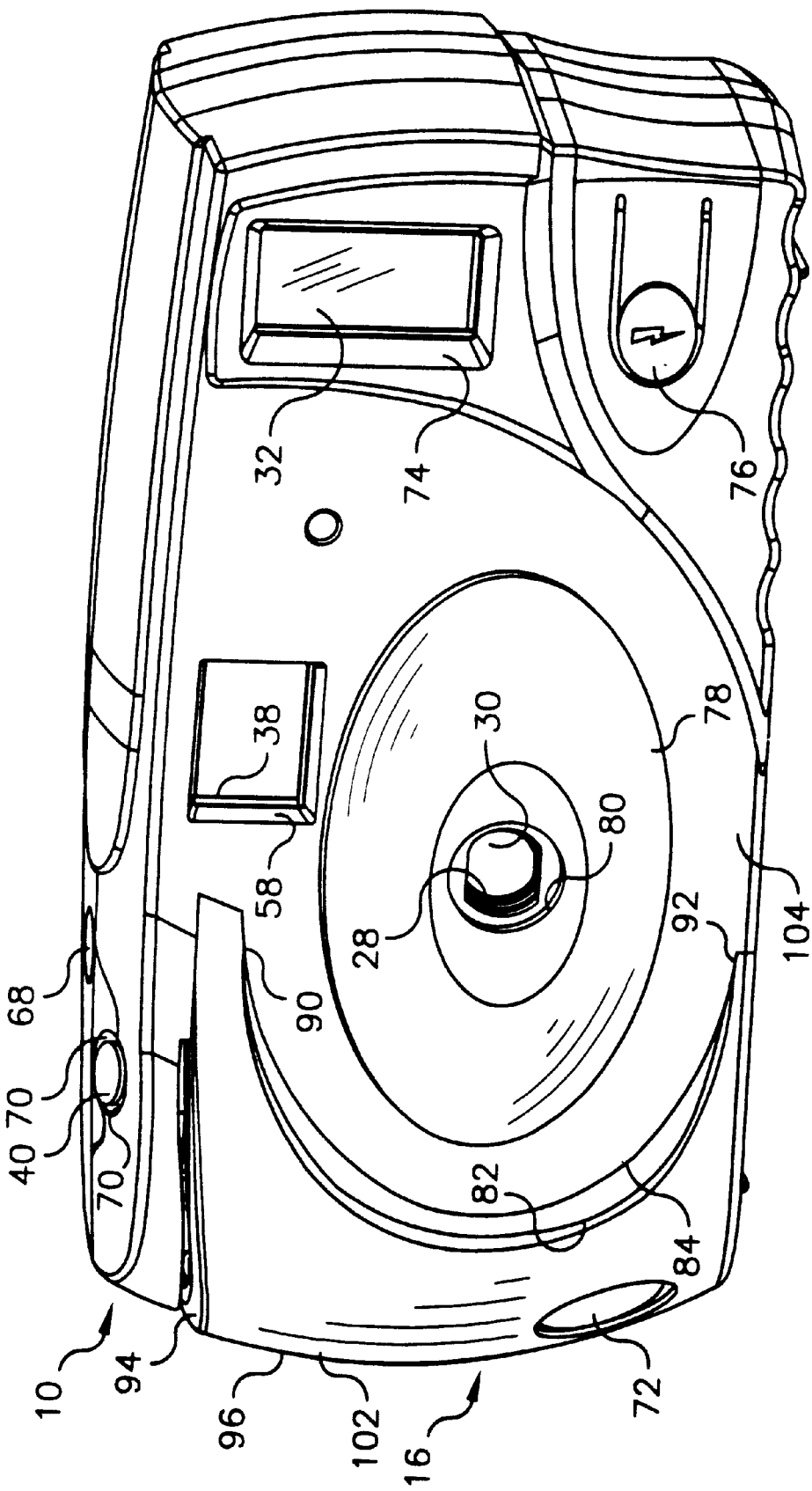
FIG. 2 is an exploded rear perspective view of the one-time-use camera.
Figure 3:
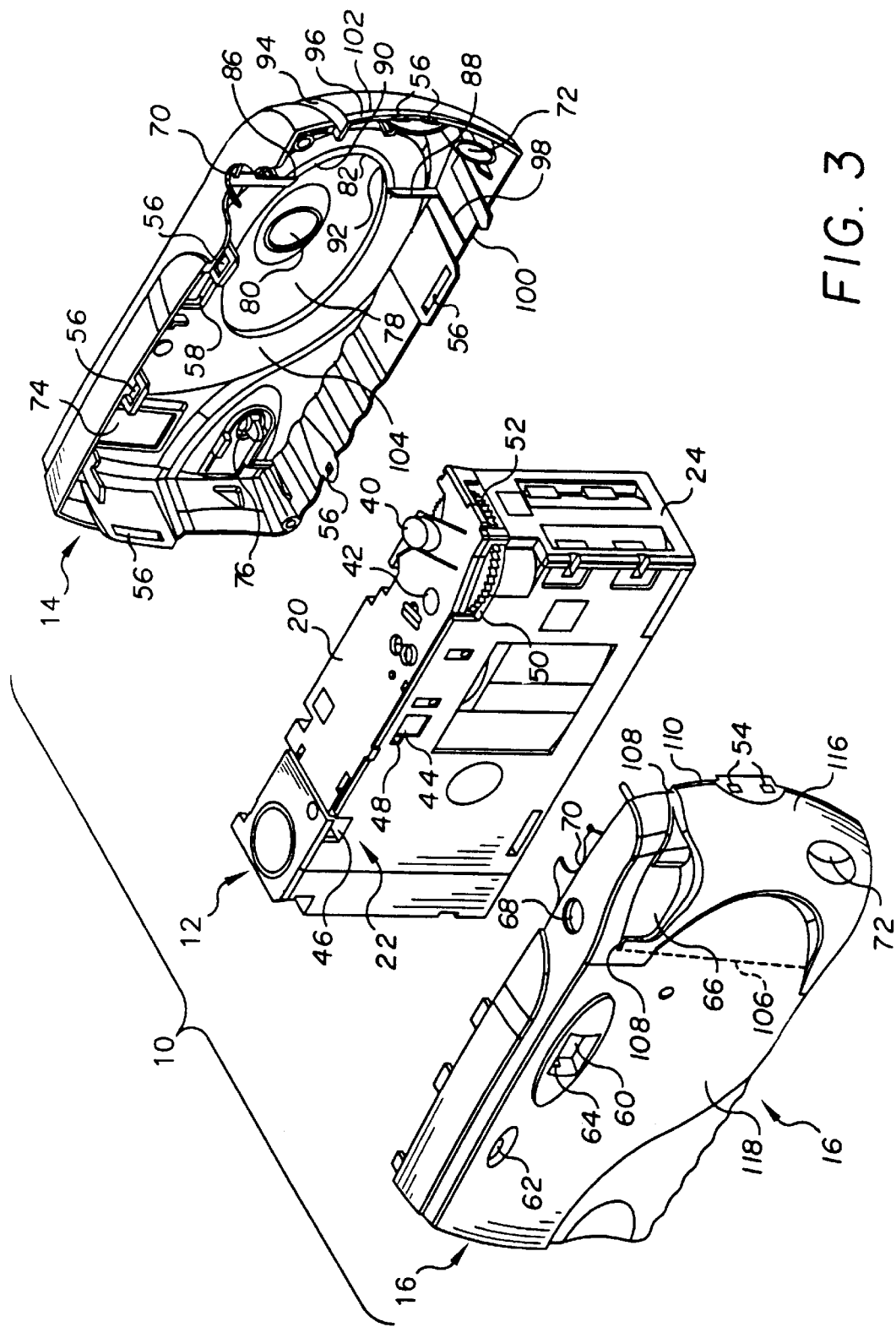
FIG. 3 is an assembled front perspective view of the one-time-use camera.
Figure 4:
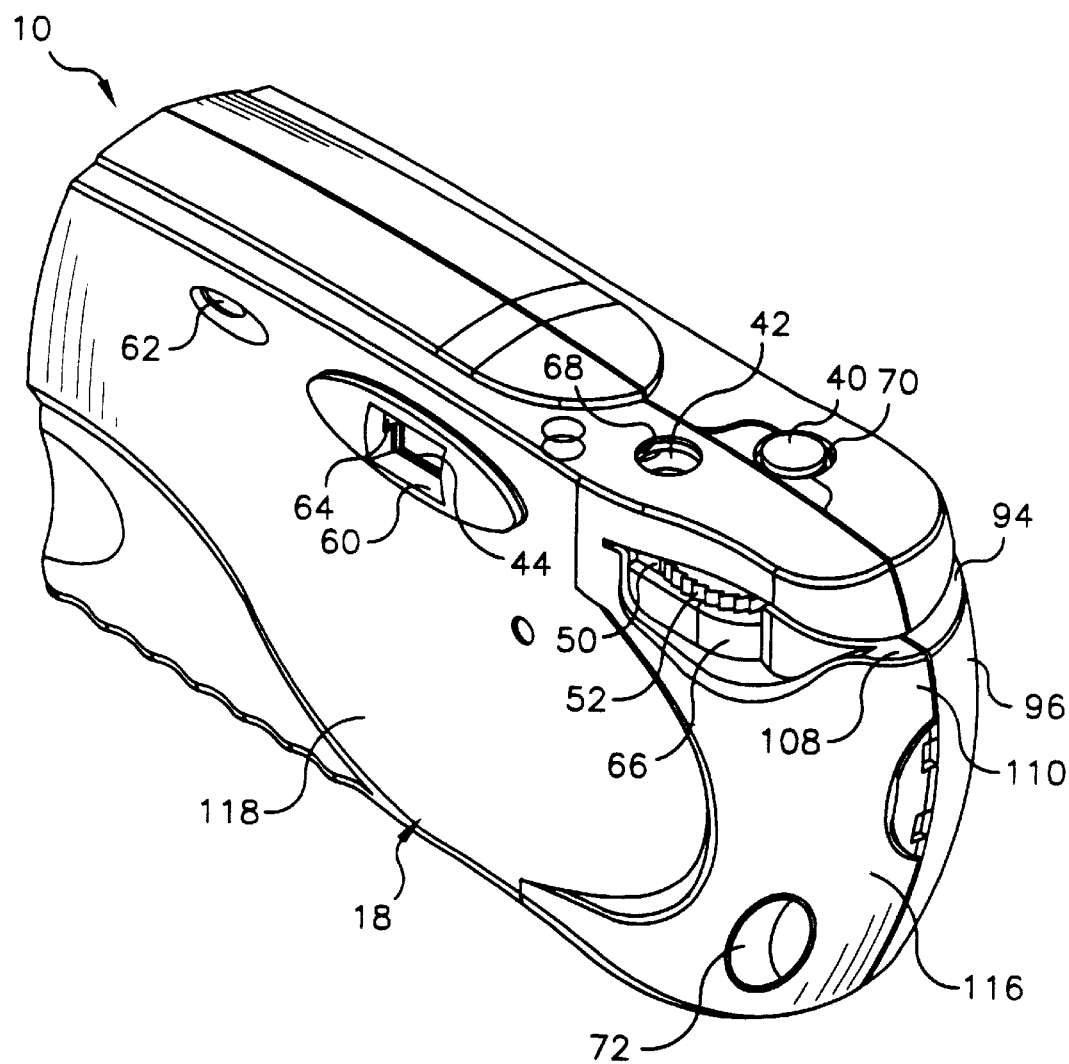
FIG. 4 is an assembled rear perspective view of the one-time-use camera.

The front cover part 18 of the recycled camera 12 has an integral projecting lens surround 26 with a lens opening 28 for a taking lens 30, a transparent flash emission window 32, a rectangular opening 34 for a flash-on resilient switch element 36 that is depressed to begin charging a built-in electronic flash (not shown), and an open-air front viewfinder opening 38. As shown in FIGS. 1 and 2, the lens surround 26 bulges out from the front cover part 14 to project from the front cover part.

The top plate 20 of the recycled camera 12 has an integral shutter release button 40 and a transparent integral exposure-counter-magnifier window 42.

The rear cover part 22 of the recycled camera 12 has an open-air rear viewfinder opening 44 that is optically aligned with the front viewfinder opening 38 in the front cover part 18 to view a subject being photographed, a flash-ready indicator opening 46 that contains a flash ready light-emitting diode or the equivalent (not shown) which is light-piped via an optical fiber to a small extension 48 of the rear viewfinder opening, and a longitudinal opening 50 from which a manually rotatable film advance thumbwheel 52 protrudes.

The outer rear cover part 16 is adapted to be positioned over the rear cover part 22, over approximately one-half of the top plate 20, and over approximately one-half of the cartridge chamber cover-door 24. The outer front cover part 14 is adapted to be positioned over the front cover part 18, over a remaining one-half of the top plate 20, and over a remaining one-half of the cartridge chamber cover-door 24. See FIGS. 1–4. As a result, the cartridge chamber cover-door 24 can not be pulled away at one of the camera ends to retrieve the film cartridge from the cartridge receiving chamber (not shown) unless the outer front and rear cover parts 14 and 16 are first removed from the recycled camera 12 in the vicinity of the cartridge chamber cover-door.

The outer front and rear cover parts 14 and 16 and the front and rear cover parts 18 and 22 are made of the same material, plastic.

A plurality of integral hooks 54 on the outer rear cover part 16 are received in respective hook-holes 56 in the outer front cover part 14 to releasably connect the two cover parts together, to recase the recycled camera 12. Respective front and rear open-air viewfinder openings 58 and 60 in the outer front and rear cover parts 14 and 16 are optically aligned with the front and rear viewfinder openings 38 and 44 in the front and rear cover parts 18 and 22 to view a subject being photographed. A flash-ready indicator opening 62 in the outer rear cover part 16 is located opposite the flash-ready indicator opening 46 in the rear cover part 22. A small extension 64 of the rear viewfinder opening 60 in the outer rear cover part 16 is located opposite the small extension 48 of the rear viewfinder opening 44 in the rear cover part 22. An access opening 66 in the outer rear cover part 16 is located opposite the longitudinal opening 50 from which the manually rotatable film advance thumbwheel 52 protrudes, to permit one to rotate the thumbwheel. A counter-hole 68 in the outer rear cover part 16 is located opposite the exposure-counter-magnifier-window 42 in the top plate 20. The shutter release button 40 on the top plate 20 projects from a pair of hole-halves 70 in the outer front and rear cover parts 14 and 16. A pair of wrist-strap holes 72 in the outer front and rear cover parts 14 and 16 are located in line to receive a flexible wrist strap (not shown). An open-air flash opening 74 in the outer front cover part 14 is located opposite the flash emission window 32 in the front cover part 18. A manually depressible flash-on button 76, cantilever-supported on the outer front cover part 14, is located opposite the rectangular opening 34 for the flash-on switch element 36 to permit one to depress the switch element to begin charging the built-in electronic flash (not shown).

The front cover part 14 has an integral, projecting, oval-shaped lens bulges out from the front cover part 14, much in the way the lens surround 26 bulges out from the front cover part 18, to provide room (space) for the lens surround 26 and surround 78 that is shaped distinctively different than the lens surround 26 of the front cover part 18. See FIGS. 1 and 3. The lens surround 78 is located over the lens surround 26 in a way that an open-air lens opening 80 in the lens surround 78 is optically aligned with the lens opening 28 in the lens surround 26.

The lens surround 78 of the front cover part 14 is partially surrounded by a slit 82 in the front cover part. The slit 82 longitudinally extends partially along a curved perimeter 84 of the lens surround 78. See FIGS. 1 and 3. A pair of longitudinally aligned grooved lines of weakness 86 and 88 on the front cover part 14 extend to respective ends 90 and 92 of the slit 82. See FIG. 2. A slit 94 in the outer front cover part 14 extends from one edge 96 of that cover part to the grooved line of weakness 86. A slit 98 in the outer front cover part 14 extends from another edge 100 of that cover part to the grooved line of weakness 88. This construction permits a relatively smaller portion 102 of the outer front cover part 14 to be broken away from a relatively larger portion 104 (including the lens surround 78) of the outer front cover part along the grooved lines of weakness 86 and 88 and separated partially around the lens surround 78.

The outer rear cover part 16 has a grooved line of weakness 106. See FIG. 1. A slit 108 in the outer rear cover part 16 extends from one edge 110 of that cover part first to the access opening 66 and then to the grooved line of weakness 106. See FIGS. 2 and 4. A slit 112 in the outer rear cover part 16 extends from another edge 114 of that cover part to the grooved line of weakness 106. This construction permits a relatively smaller portion 116 of the outer rear cover part 16 to be broken away from a relatively larger portion 118 of the outer rear cover part along the grooved line of weakness 106. The grooved line of weakness 106, the slit 108, and the slit 112 are variants of prior art equivalents.

When the relatively smaller portion 102 of the outer front cover part 14 is broken away from the relatively larger portion 104 of the outer front cover part along the grooved lines of weakness 86 and 88 and separated partially around the lens surround 78, and the relatively smaller portion 116 of the outer rear cover part 16 is broken away from the relatively larger portion 118 of the outer rear cover part along the grooved line of weakness 106, the cartridge chamber cover-door 24 can be pulled away to retrieve the film cartridge from the cartridge receiving chamber.

The invention has been described with reference to a preferred embodiment. However, it will be appreciated that variations and modifications can be effected by a person of ordinary skill in the art without departing from the scope of the invention.

10. recased camera
12. recycled camera
14. outer front cover part
16. outer rear cover part
18. front cover part
20. top plate
22. rear cover part
24. cartridge chamber cover-door
26. lens surround
28. lens opening
30. taking lens
32. flash emission window
34. rectangular opening
36. flash-on switch element
38. front viewfinder opening
40. shutter release button
42. exposure counter magnifier window
44. rear viewfinder opening
46. flash-ready indicator opening
48. small extension
50. longitudinal opening
52. film advance thumbwheel
54. hooks
56. hook-holes
58. front viewfinder opening
60. rear viewfinder opening
62. flash-ready indicator opening
64. small extension
66. access opening
68. counter-hole
70. pair of hole-halves
72. pair of wrist-strap holes
74. flash opening
76. flash-on button
78. lens surround
80. lens opening
82. slit
84. curved perimeter
86. grooved line of weakness
88. grooved line of weakness
90. end
92. end
94. slit
96. edge
98. slit
100. edge
102. smaller portion
104. larger portion
106. grooved line of weakness
108. slit
110. edge
112. slit
114. edge
116. smaller portion
118. larger portion

What is claimed is:

1. A recased one-time-use camera comprising a recycled one-time-use camera with a taking lens, and a front cover part that includes a projecting lens surround that bulges out from said front cover part and has a lens opening for said taking lens, is characterized in that:

an outer cover part is positioned over said front cover part of said recycled one-time-use camera and includes a projecting lens surround that bulges out from said outer cover part to provide room for said projecting lens surround of said front cover part that bulges out from said front cover part, is shaped distinctively different than said lens surround of the front cover part, has an open-air lens opening, and is fitted over the lens surround of the front cover part in a way that the lens opening in the lens surround of said outer cover part is optically aligned with the lens opening in the lens surround of the front cover part, in order to recase said recycled one-time-use camera.

2. A recased one-time-use camera as recited in claim 1, wherein said front cover part has a flash emission window, and said outer cover part has an open-air flash emission opening opposite said flash emission window.

3. A recased one-time-use camera as recited in claim 1, wherein said front cover part has a front viewfinder opening, and said outer cover part has an open-air viewfinder opening opposite said front viewfinder opening.

4. A recased one-time-use camera as recited in claim 1, wherein said front cover part and said outer cover part are made of the same material.

5. A one-time-use camera as recited in claim 1, wherein a rear cover part has a longitudinal opening, a manually rotatable thumbwheel protrudes from said longitudinal opening, and a rear outer cover part which is a separate piece from said outer cover part positioned over said front cover part is positioned over said longitudinal opening with an access opening in said rear outer cover part opposite the longitudinal opening to permit one to manually rotate said thumbwheel.

* * * * *